United States Patent
Chow et al.

(10) Patent No.: US 7,917,957 B2
(45) Date of Patent: Mar. 29, 2011

(54) METHOD AND SYSTEM FOR COUNTING NEW DESTINATION ADDRESSES

(75) Inventors: Stanley TaiHai Chow, Ottawa (CA); Peter Rabinovitch, Kanata (CA); Bassem Abdel-Aziz, Kanata (CA)

(73) Assignee: Alcatel Lucent, Paris (FR)

( * ) Notice: Subject to any disclaimer, the term of this patent is extended or adjusted under 35 U.S.C. 154(b) by 973 days.

(21) Appl. No.: 11/802,965

(22) Filed: May 29, 2007

(65) Prior Publication Data
US 2008/0301812 A1    Dec. 4, 2008

(51) Int. Cl.
*G06F 11/00* (2006.01)
*G06F 7/04* (2006.01)
*H04L 9/00* (2006.01)

(52) U.S. Cl. ............... 726/24; 726/25; 726/26; 726/27; 726/28; 726/29; 713/168; 713/169; 713/170; 713/171; 713/172

(58) Field of Classification Search ............... 726/24
See application file for complete search history.

(56) References Cited

U.S. PATENT DOCUMENTS

2004/0054925 A1    3/2004    Etheridge
2006/0294588 A1*   12/2006   Lahann et al. ............ 726/23
2009/0044276 A1    2/2009    Abdel-Aziz

OTHER PUBLICATIONS

Estan, Cristian et, al., Bitmap Algorithms for Counting Active Flows on High Speed Links, Oct. 27-29, 2003, Miami Beach, Florida.*
Cliff C. Zou, et al., "The Monitoring and Early Detection of Internet Worms", pp. 1-14.
Sekar, Vyas et, al., A Multi-Resolution Approach for Worm Detection and Containment, International Conference on Dependable Systems and Networks, 2006.
Estan, Cristian et, al., Bitmap Algorithms for Counting Active Flows on High Speed Links, XP-002523818 Oct. 27-29, 2003, Miami Beach, Florida.
Yang, Xiong et, al., Simulation and Evaluation of a New Algorithm of Worm Detection and Containment, 2006.
Pele, Li et, al., A Survey of Internet Worm Detection and Containment, IEEE Communications Surveys & Tutorials, 2008, vol. 10, No. 1.

* cited by examiner

*Primary Examiner* — Longbit Chai
(74) *Attorney, Agent, or Firm* — Kramer & Amado, PC

(57) ABSTRACT

Packets of a certain type from a certain source are directed to a system that estimates the set of destinations and the number of new destinations for which that source has sent packets during a time window $T_i$. Instead of maintaining tables with the complete destination addresses for each source, the destination addresses are hashed and stored in a small bit array. The sets of destinations for a number of successive time windows are OR'ed for building cumulative tables $C_i$, where $C_i$ includes all destinations that have been seen between $T_0$ and $T_i$. The new destinations are determined by counting the destinations set in $T_i$ but not in $C_{i-1}$. Any change from the typical patterns can be suspected as being a slow scan.

20 Claims, 1 Drawing Sheet

METHOD AND SYSTEM FOR COUNTING NEW DESTINATION ADDRESSES

FIELD OF THE INVENTION

The invention is directed to communication networks and in particular to a method and system for counting destination addresses in a data network.

BACKGROUND OF THE INVENTION

The reliability and security of an IP network is essential in a world where computer networks are a key element in intra-entity and inter-entity communications and transactions. While the current network security systems have been around for years, to date none have been able to deliver on the final goal of providing full protection against all malicious attacks with little associated cost and annoyance.

Providing a security solution requires an understanding of possible threat scenarios and their related requirements. There are many types of security concerns that must be considered in a network, among which, the network worms are regarded as a growing threat. Lately, large scale worms spread all over the Web, producing serious damages both to the network/service providers and users. Attacks on network security increased tenfold between 1993 and 2003, from 1,334 to 137,529 (CERT Coordination Center). Furthermore, 20-40 new or variant virus threats were reported daily to TrendMicro in 2003. The number of attacks between January and June, 2003 exceeded 70,000, which is the double of those of the previous year (Reuters). Viruses cost businesses around the world $55 billion in 2003, up from $13 billion in 2001 (TrendMicro).

In essence, a worm is a self-replicating computer program that sends copies of itself to other hosts over the network. Worms are easier to spread and are more dangerous than viruses as they generally do not need user intervention in order to spread. It is common for worms to be noticed only when their uncontrolled replication consumes system resources, slowing or halting other applications. In addition to their ability to spread, most worms try to perform other malicious actions, such as recording and exposing critical information about the users to the worm creators. Infected PCs can also be used by hackers to launch Distributed Denial of Service (DDOS) attacks. DDOS attacks are usually sophisticated and originate from infected computers that are spread over wide geographic areas. This makes it hard to counter such attacks. They affect web servers and in many cases other services essential to Internet Service Providers (ISPs) such as Domain Name Service (DNS). By hijacking trusted applications such as web servers, mail transfer agents and log-in servers, which typically run with elevated privileges, worms can gain full access to system resources, and cause a complete system compromise. Even though the impact of a single worm on any given piece of network equipment can be benign, the cumulative effects of tens of thousands of infected network devices spreading the malware to other devices connected to the network can be disastrous.

Network security is one of the biggest challenges of the Internet, due to Internet's unrestricted connectivity, openness, and widespread software homogeneity. Infected hosts with high bandwidth network connections can initiate thousands of connections requests/second, each of which has the potential to spread the infection. Worm detection must be performed quickly to recognize and identify the attacker. Also, antivirus systems are of little use if they fail to be triggered quickly after a host is infected.

Stealth worms, or slow-spreading worms, are worms that make infection attempts at a rate significantly below the rate of the normal traffic. Worms that escape notice without being specifically designed to do so are sometimes also described as stealth viruses/worms. A stealth worm has various mechanisms designed to avoid detection by antivirus software. Typically, when an antivirus software runs, the stealth worm hides itself in the memory, and uses various tricks to also hide changes it has made to any host software and data. For example, a stealth worm may maintain a copy of the original, uninfected data in a certain area of the host memory and monitor the host activity. When the antivirus software attempts to find if data has been altered, the worm redirects it to the storage area that maintains the original, uninfected data, so that the antivirus software is tricked into believing that the host is healthy.

While the techniques used by the stealth worms limit the infection rate, these worms merely require more time to achieve the same growth as the fast worms, while being significantly harder to catch as they blend in with the normal traffic. The purpose of worms is also changing: with the new emphasis on crime and monetary profits, stealth worms are being used to target particular companies or customer to steal passwords, credit card information and so on. This means that many stealth worms are designed to stay-under-the-radar by purposely not infecting many machines so as to remain undetected. The implication is that stealth worms have a very different behavior than the flash worms and require different detection techniques.

The costs associated with detecting and preventing security attacks are overwhelming. Today, enterprises deploy a layered defense model, which includes firewalls, anti-virus systems, access management and intrusion detections systems (IDS). Besides being expensive, responsiveness of these defense systems is impacted by the fact that the current solutions are based on multiple components, which may have problems to communicate and coordinate the required counter-measures.

A methodology for detection of Internet worms is presented in the article "The Monitoring and Early Detection of Internet Worms" (Zou et al.), August 2004. The system proposed in this article uses a Kalman filter to estimate traffic parameters in a known epidemic model. The problem with this approach is twofold: first, the Kalman filters are difficult to implement, and second, assuming that a worm spreads according to a specific class of epidemic models is dangerous, as the malware could be coded in a way so as to avoid this type of behavior.

Most research on worm detection has focused so far on catching fast spreading worms. For example, the co-pending patent application Ser. No. 11/450,348 (Rabinovitch), entitled: "Method for Estimating the Fan-In and/or Fan-Out of a Node" filed 12 Jun. 2006 and assigned to Alcatel describes a method for detecting anomalies in traffic patterns and a traffic anomalies detector are presented. The method and the detector are based on estimating the fan-in of a node, i.e. the number of distinct sources sending traffic to a node, based on infrequent, periodic sampling. Destinations with an abnormally large fan-in are likely to be the target of an attack, or to be downloading large amounts of material with a P2P application. The method and the anomalies detector are extremely simple to implement and exhibit excellent performance on real network traces.

Co-pending patent application Ser. No. 11/656,434 (Chow et al.) fully identified above describes a malware detection and response system based on traffic pattern anomalies detection, whereby packets on each port of a network element (NE)

are counted distinctly over a selected period of time, according to their transmission protocol and traffic direction. An attack is declared when an individual count or combination of counts exceeds a threshold. The system can be incorporated into the fast path, that is, the data plane, enabling communications systems such as switches, routers, and DSLAMs to have built-in security at a very low cost.

However, as discussed above, detecting a worm that scans fast has its own set of techniques, which cannot apply to slow worms. Little work (if any) has been done on detecting worms that spread at a rate that is so slow that they can not be detected by the above mentioned types of methods. The above described malware detection method will not notice anything unusual in case of worms that only attempt a single probe in each time window, or even a single probe in many time windows.

SUMMARY OF THE INVENTION

It is an object of the invention to provide a system for detecting propagation of stealth worms.

Accordingly, the invention provides a system for detecting a stealth worm attack in a communication network, comprising, on a port of a network element connected in the network: means for extracting address data from the header of data packets seen on the port, wherein the address data identifies the destination of the packets; a destinations number estimating unit for maintaining a cumulative table $C_i$ with all destinations to which a specified source in the network has sent packets during a predetermined period of time $T_i$-$T_0$, and estimating a number of new destinations counted in a current time window $T_i$; an attack identification unit for comparing the number of new destinations with an expected number of new destinations and identifying an attack if the number of new destinations exceeds the expected number by a threshold; and a timing unit for setting the duration of the time window.

The invention also provides a system for detecting a stealth worm attack in a communication network, comprising, on a port of a network element connected in the network: means for extracting address data from the header of data packets seen on the port, wherein the address data identifies the source of the packets; a sources number estimating unit for maintaining a cumulative table with all sources from which a specified destination in the network has received packets during a predetermined period of time $T_i$-$T_0$, and estimating a number of new sources counted in a current time window $T_i$; an attack identification unit for comparing the number of new sources with an expected number of new sources and identifying an attack if the number of new destinations exceeds the expected number by a threshold; and a timing unit for setting the duration of the time window.

The invention is also directed to a method for detecting a stealth worm attack from a network element connected in a communication network, comprising: i) extracting on a port of the network element address data from the header of data packets having a specified source in the network, wherein the address data identifies the destination of the packets; ii) maintaining a cumulative table with all destinations to which the specified source has sent packets during a predetermined period of time $T_{i-1}$-$T_0$ iii) estimating a number of new destinations to which the source has sent packets in a current time window $T_i$; and iv) comparing the number of new destinations with an expected number of new destinations and identifying an attack if the number of new destinations exceeds the expected number by a threshold.

BRIEF DESCRIPTION OF THE DRAWINGS

The foregoing and other objects, features and advantages of the invention will be apparent from the following more particular description of the preferred embodiments, as illustrated in the appended drawings, where.

Figure 1:
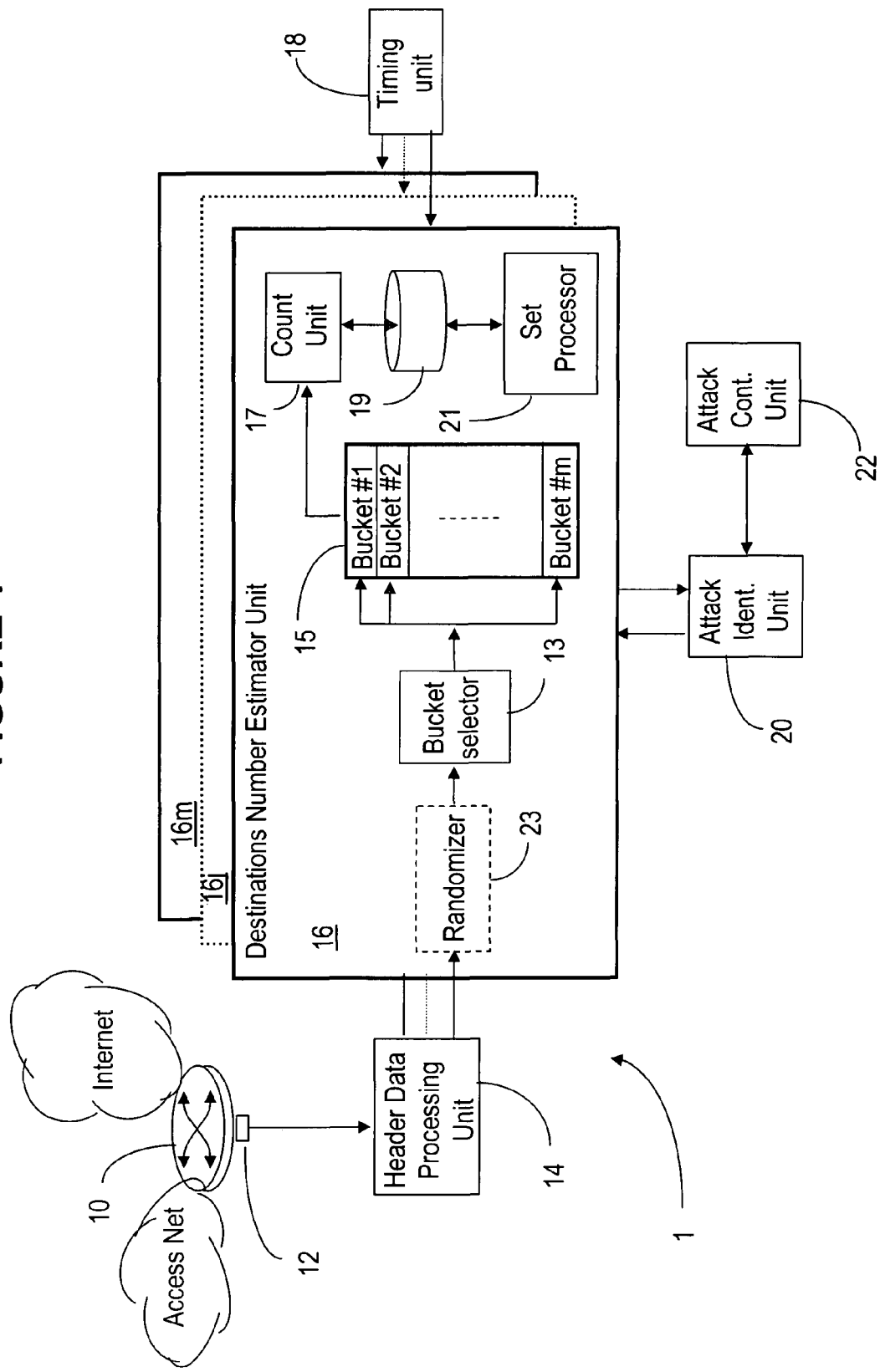
FIG. 1 illustrates the block diagram of an embodiment of the invention.

The invention is directed to a system for detecting propagation of stealth, slow probing worms.

In this specification, units through which digital data are transmitted from one point to another over a communication path are referred to generically as packets. This term includes data units formatted according to various transmission protocols, such as IP packets, TCP packets, frames, etc. As well, the system of the invention can be installed in any region of a network, with an adequate sizing for the targeted equipment (i.e. more flows implies larger amount of memory, etc.).

From the security point of view, a relevant metric to detect malware is to determine the number of distinct sources sending traffic to a monitored destination, referred to as "node fan-in". Destinations with an abnormally large fan-in are likely to be the target of an attack, or to be downloading large amounts of material with a point-to-point application. This is equivalent to determining the sources with the highest fan-out (number of distinct destinations from a certain source), by interchanging the roles of source and destination; this is known as "node fan-out". Sources with an abnormally large fan-out may be attempting to spread a worm or virus.

The system of the invention collects for each source, during a predetermined time window denoted with T, a representation of the set of destinations to which that source has sent packets. While the destination address for each packet can be kept to obtain a complete list of the IP addresses of the destinations, such a list would consume system resources and as such it would not be scalable. A better way to keep such a list is to use a compact block representing the set of destinations, as described in the above-identified parent U.S. patent application Ser. No. 11/656,434. The block can then be used for estimating the fan-out of a source (i.e. the number of distinct destinations the source is sending packets to), based on periodic sampling of the number of destinations seen at a node of the network.

FIG. 1 shows the block diagram of a system 1 for counting the new destinations seen by node 10. System 1 according to an embodiment of the invention enables sheath worm detection by trending the fan-out of a node (number of distinct destinations that receive packets from a certain source). It is also to be noted that embodiments where estimation of the number of sources that send packets to a certain destination may be may be also used to detect stealth worms, using a similar arrangement to that shown in FIG. 1 by trending the fan-in of a node (number of distinct sources that send packets to a certain destination).

In FIG. 1, a port 12 of a network node or network element (NE) 10 is equipped with system 1 that monitors the packets leaving port 12. The monitoring may be performed on selected ports or on all ports of a NE; FIG. 1 shows only port 12 by way of example. In this embodiment, system 1 includes a header data processing unit 14, destinations number estimating units 16 to 16m, an attack identification unit 20 and a timing unit 18. The system may also include an attack containment unit 22.

Header data processing unit 14 monitors the packets seen on the port 12 and examines the data in various fields of the packets header with a view to determine the packet type and to identify the source and destination of the packet. The term "packet type" refers here to the protocol used by the respective packet (e.g. IP, TCP, FR, MPEG, etc). Once the packet type is identified, the header data processing unit 14 identifies the source of the packet and extracts destination addresses data from the packet header. The techniques used for determining the type of packets on port 12 and for identifying the source address and extracting the destination address data from the header are beyond the scope of this invention. It is to be understood that any method for uncovering this information may be used as long as unit 14 does not impact operation of the datapath.

As shown in FIG. 1, an estimating unit 16 is kept for each source address and packet type seen on port 12. The source address and packet type are used to identify the appropriate estimating unit 16 to be updated for the current packet seen on port 12. The destination address extracted by the header data processing unit is referred here as the "destination address data" or "address data". This address data may be the destination IP address, or the destination IP address and destination port number or a combination of these.

Timing unit 18 illustrates generically selection of a time interval adopted for the time window T, over which the address data extracted from the incoming packets is processed and collected. The duration of the time window is a design parameter, selected according to the packet type, data rate on port 12 and other design parameters. In addition, T is selected according to the needs of the network operator. Thus, a shorter time window allows for a quicker detection of any anomaly, but it will consume more resources and results will have less confidence. A longer time window will provide more accurate information, at a slower rate. The default for the T parameter is expected to be in the range of a few minutes.

Estimating unit 16 is used for identifying the destinations (also referred to as far-end hosts) to which the respective source (also referred to as the "specified source") sends packets. As seen in FIG. 1, system 1 uses preferably a plurality of estimating units 16. The number of units 16 is a design parameter, depending on the number of sources that the provider wishes to monitor, the types of the packets to be monitored, the direction of transmission, etc. For example, port 12 may be equipped with an estimating unit 16 for each direction of traffic and each packet type. It is to be noted that while it is desirable to maintain distinct units 16 for each of the possible packet types listed above, it is also possible to combine these units for selected packet types (protocols). There is a lot of value even in the extreme case of using only a single block unit for all incoming and outgoing packets.

Each port, or only some ports of interest on network element 10 may be equipped with the system 1 of the invention. An advantage of this invention is that it is not necessary to synchronize the polling for all ports of the network element; spreading out the polling does not impact negatively on worm detection. Depending on the platform, one easy way is to integrate the pooling of the counters with SNMP polls, which means checking the counters of a port as the SNMP packets for that port are processed. Also, realistically, there is no need for high precision in the polling interval so it can be done as a low priority task.

Block 16 comprises a bucket selector 13, a plurality of buckets, which can be a bit or a counter 15, a buckets count unit 17, a set processor unit 21, and a memory 19, described next.

The bucket selector 13 hashes the address data from the fields of the header that identify the destination host. As an example, in case of IP packets, the bits that are hashed are the IP destination address bits of the packet, or the IP destination address and port number bits. The hash value provided by selector 13 is then used as an index into array 15, for setting the bucket corresponding to the respective hash value. In this way, each bucket is associated with a certain set of destination host addresses, because the hash function performed over the bits in the same header fields is the same if the bits are the same.

The number of buckets into array 15 is a design parameter and is selected based on the intended scope of worm detection at that particular node and port, precision of attack detection required, resources available at the respective node/port, cost, etc. Preferably, buckets 15 are provided in a memory 19, which could be shared by the estimating units 16-16$m$.

Buckets count unit 17 determines which and how many buckets are set in array 15 during a current time window $T_i$. The term "current number of buckets set" refers to the number of the buckets that were set during the current time window. The set of destinations identified during the current time window, also referred to as the "current set of destinations" and denoted with X, is stored in memory 19 along with the current number of buckets set. Thus, X indicates how many and which far-end hosts received traffic from the respective source during the current time window. An attack may be for example detected if the number of far-end hosts is suspiciously high, or in other words, if the difference between the number of new destinations counted in the current time window $T_i$ and the expected number of new destinations is greater than a threshold.

Each bucket could be set repeatedly (once for each applicable packet) or it could be set only once during the time window, using a very simple algorithm. For a system 1 with m buckets Bucket#1 to Bucket#m, if bucket selector 13 determines a hash value that identifies one of the buckets, let's say, a Bucket#i, and that bucket has already been seen (set), nothing happens. If, on the other hand, if Bucket#i has not been set yet, it is set. The pseudo code for bucket updating is:

```
Declare seen as Boolean[m];    set m buckets
Bucket = hash(IP, port);       hash header data to find bucket number
If (seen[bucket]);             bucket already seen, do nothing
else;                          bucket not seen yet
   count = count + 1;
   seen[bucket] = true;
endif
```

In one experimental embodiment of the invention the buckets for a certain source were implemented on a bit array of 8 bits. Since the IP address space is 32 bits, for an 8-bit hash, there is a choice of $2^{24}$ combinations in the same bucket. In other words, $2^{24}$ different addresses data may set the same bucket. This means that an attacker could attempt to avoid detection by talking to hosts/ports that fall into the same bucket in order to keep the number of far-end hosts low. However, such an action requires knowledge of the hash function used for the bucket selector 13. Certain countermeasures may be used with a view to address this situation. For example, the hash function used by the bucket selector 13 may be designed so that addresses in the same subnet would likely use different buckets.

In general, selection of the hash function depends on the complexity of the attack detection desired. There many possible implementations for hashing the address data, one way is to use the "Linear Counting" function described in "A Linear-Time Probabilistic Counting Algorithm for Database Applications", Whang et al. available at: dblab.kaist.ac.kr/Publication/pdf/ACM90_TODS_v15n2.pdf. This paper presents a thorough mathematical treatment of these counting techniques. This type of function has been selected because it is the most accurate of the whole family of probabilistic counting techniques. Whang et al. derive the best estimate of the actual linear count:

$$\hat{n} = -m^* \ln(z/m)$$

where m is the array size, z is the number of unset entries in the array, and n is the real count.

Whang et al. also derive the error estimate for this type of function as:

$$StdErr(\hat{n}/n) = \frac{\sqrt{m(\exp(t) - t - 1)}}{n}$$

where t is a load factor determined by the n/m ratio.

The paper also gives guidelines for obtaining a desired accuracy. If we apply the finding of this paper to the system of the invention, it is noted that the size of array 15 may be reduced significantly from the 256 bits discussed above, without a significant impact on the accuracy of malware detection. A smaller array is desirable in order to make the implementation easier in software. For the system of the invention, if array 15 has four bytes (rather than 256), the resulting accuracy is 17%. For a two byte array, the accuracy drops to 35%. This means even a very little memory space dedicated to the array still enables comprehensive results.

In addition, further randomizing of the bucket selection (besides hashing the address data) may be achieved using a various arrangements, shown generically by a randomizer 23. Randomizer 23 may have various embodiments. It may for example operate by XOR-ing the four address bytes together, which is another way to differentiate the sub-networks. Or, it is possible to XOR the last byte of the IP address and the lower byte of the port number; this will ensure that neither horizontal scanning (same port number, different IP address) nor vertical scanning (same IP address, different port) will end up in the same bucket. Also, a random number (e.g. a 32 bit number) may be picked at boot time and added to the address data before doing the XOR. This preserves the sub-net scattering property above making it difficult for the attacker to stay in the same bucket.

As indicated above, the bucket selector unit 13 does not distinguish between destinations that hash to the same bucket, so the statistics are not exact. While this is currently the preferred implementation for counting the far-end hosts, any other scheme that provides such a set of destinations can be used, thus allowing for tuning of accuracy vs. resource requirements, engineering costs, etc. Also, the information obtained by hashing address data may be collected using other methods; the idea is to keep in memory 19 sets of destination (IP) addresses for each source over the successive time windows. While each set may not be complete, it provides a good estimate of the destinations to which a source sends packets, without consuming a lot of memory and processing power at the node.

A beneficial property of the way the data is collected is that OR'ing two sets produces a "block" that is equivalent to counting the combined set. This property is used by the set processor 21 in the invention for determining when new destinations appear in a table. At the end of each time window, the set processor 21 prepares a "cumulative table" $C_i$ with the destination addresses identified and counted over predetermined period of time $T_i$-$T_0$, (including i time windows). The predetermined period of time is measured in successive time windows. Processor 21 prepares the cumulative table by OR'ing successive sets of destinations obtained over successive time windows. Each $C_i$ is exactly the set of destinations that has been seen from time 0 to time i.

Destinations number estimating unit 21 then calculates how many new destinations are present in the current time window $T_i$, by comparing $C_i$ to $C_{i-1}$. The typical pattern for the respective source is also recorded in memory 19. This data indicates how many new destinations are normally introduced in the normal traffic throughout comparable time intervals. Any change between the number of new destinations from the typical pattern, such as a regular introduction of new destinations can be suspected as being a slow scan is taking place. Such abnormal behavior is identified by attack identification unit 20.

FIG. 1 shows generically attack identification unit 20 and attach containment unit 22; it is to be noted that identification and containment of any stealth worm attack may be performed by any method available to the network provider, can be effected locally at the node, or by a network management system, etc. It is also to be noted that units 20 and 22 may be provided on a separate workstation, or/and may be part of a network management system.

It is desirable to combine this detection with other techniques to virtually eliminate false positives. For example, it can be combined with methods of tracking DNS look ups and SYN connection attempts—if a failed connection attempt is to a new destination that did not come from DNS look up, it is almost certain that it is a scan probe. This can be easily accomplished by keeping, as indicated above, several units 16, one for each event, and correlating appropriately the results obtained from these units.

We claim:

1. A system for detecting a slow scan stealth worm attack in a communication network, comprising, on a port of a network element connected in said communication network:
   means for extracting address data from a header of data packets seen on said port, wherein said extracted address data identifies a destination of said data packets;
   a destinations number estimating unit for maintaining a cumulative table $C_i$ with all destinations to which a specified source in said communication network has sent data packets during a predetermined period of time $T_{i-1}$-$T_0$, and estimating a number of new destinations counted in a current time window $T_i$ based upon detection of destination addresses in a plurality of buckets, wherein each of the destination addresses within a certain set of the destination addresses uses a different bucket based on a hash index from a bucket selector;
   an attack identification unit for comparing the estimated number of new destinations with an expected number of new destinations, based upon how many new destinations would normally occur during the current time window associated with one of the plurality of buckets, and identifying the slow scan stealth worm attack if said estimated number of new destinations exceeds said expected number by a threshold; and
   a timing unit for setting a duration of said current time window.

2. The system as claimed in claim 1, further comprising:
   an attack containment unit for containing the slow scan stealth worm attack identified by said attack identification unit.

3. The system as claimed in claim 1, wherein said means for extracting address data is a header data processing unit that identifies all data packets seen on said port having a source address corresponding to an address of said specified source and extracts said address data from the header of such packets.

4. The system as claimed in claim 1, wherein said destinations number estimating unit further comprises:
a memory;
a bucket array of a plurality of buckets, each of the plurality of buckets being associated with a certain destination;
a bucket selector for identifying a bucket based on the address data from the header of the data packet and setting said identified bucket;
a count unit for counting all buckets set in said current time window to estimate a current number of buckets set, and storing in said memory a current set of destinations identifying all destinations to which said source has sent packets during said current time window, said set being associated with the estimated current number of buckets set; and
a set processor for preparing said cumulative table with said destinations obtained over said predetermined time period, and determining the number of new destinations by comparing the destinations in said current set with the destinations in said cumulative table.

5. The system as claimed in claim 4, wherein said bucket identified by said bucket selector is set only if said bucket has not been previously set during said current time window.

6. The system as claimed in claim 4, wherein said bucket selector applies a hash function to said address data for identifying said bucket.

7. The system as claimed in claim 6, further comprising:
a randomizer for randomizing the bits of said address data before said bucket selector applies said hash function to said address data.

8. The system as claimed in claim 1, further comprising:
a plurality of destinations number estimating units, the number of units being a design parameter based at least on types of the data packets seen on said port and the number of sources that use said port.

9. A system for detecting a slow scan stealth worm attack in a communication network, comprising, on a port of a network element connected in said communication network:
means for extracting address data from a header of data packets seen on said port, wherein said extracted address data identifies a source of said packets;
a destinations number estimating unit for maintaining a cumulative table with all destinations from which a specified source in said communication network has sent data packets during a predetermined period of time $T_{i-1}$-$T_0$, and estimating a number of new destinations counted in a current time window $T_i$ based upon detection of destination addresses in a plurality of buckets, wherein each of the destination addresses within a certain set of the destination addresses uses a different bucket based on a hash index from a bucket selector;
an attack identification unit for comparing the estimated number of new destinations with an expected number of new destinations, based upon how many new destinations would normally occur during the current time window associated with one of the plurality of buckets, and identifying the slow scan stealth worm attack if number of new destinations exceeds said expected number by a threshold; and
a timing unit for setting a duration of said current time window.

10. A method for detecting a slow scan stealth worm attack from a network element connected in a communication network, comprising:
extracting, on a port of said network element, with a header data processing unit, address data from the header of data packets having a specified source in said network, wherein said address data identifies the destination of said packets;
maintaining a cumulative table with all destinations to which said specified source has sent packets during a predetermined period of time $T_{i-1}$-$T_0$;
estimating a number of new destinations to which said source has sent packets in a current time window $T_i$ based upon detection of destination addresses in a plurality of buckets, wherein each of the destination addresses within a certain set of the destination addresses uses a different bucket based on a hash index from a bucket selector;
comparing the number of new destinations with an expected number of new destinations, based upon how many new destinations would normally occur during the current time window associated with one of the plurality of buckets; and
identifying the slow scan stealth worm attack if said number of new destinations exceeds said expected number by a threshold.

11. The method as claimed in claim 10, further comprising:
containing the attack identified in the identifying step.

12. The method as claimed in claim 10, wherein the extracting step further comprises:
determining the packet type of said packets by inspecting the header of the packets seen on said port;
based on said packet type, inspecting the relevant fields in the header of said packets for identifying packets received from said specified source; and
extracting said address data from the header of each packet received from said specified source.

13. The method as claimed in claim 12, further comprising:
determining said packet type by the protocol used for transmitting said respective packet.

14. The method as claimed in claim 10, wherein said address data includes one of an IP address and an IP address-port combination.

15. The method as claimed in claim 10, wherein the maintaining step further comprises:
hashing said address data for obtaining a hash value;
setting a bucket of a bucket array selected based on said hash value, each bucket in said bucket array being associated with a certain destination;
counting the buckets set in said current time window;
storing in a memory a current set of destinations identifying all destinations to which said source has sent packets during said current time window, said current set being associated with the current number of destinations identified during the current time window $T_i$; and
preparing said cumulative table with all destinations to which said specified source has sent packets during a predetermined period of time $T_{i-1}$-$T_0$.

16. The method as claimed in clam 15, wherein the estimating step further comprises:
comparing the destinations in said current set with the destinations in said cumulative table; and
determining the number of new destinations by counting the destinations that are not present in said cumulative table.

17. The method as claimed in claim 15, wherein a bucket is set only if said bucket has not been previously set during said time window.

18. The method of claim 15, further comprising:
selecting a hash function based upon desired complexity of attack detection.

19. The method of claim 10, further comprising:

randomizing the plurality of buckets by performing an XOR operation on at least address bytes of the address data.

20. The method of claim 10, further comprising:

randomizing the plurality of buckets by adding a random number to the address data.

* * * * *